Sept. 6, 1955  W. HEINIGER  2,717,055
MOTION PICTURE CAMERA
Filed Jan. 22, 1953  3 Sheets-Sheet 1

INVENTOR
Wilfred Heiniger.

BY  Emery L. Groff
ATTORNEY

Sept. 6, 1955 W. HEINIGER 2,717,055
MOTION PICTURE CAMERA
Filed Jan. 22, 1953 3 Sheets-Sheet 2

INVENTOR
Wilfred Heiniger.

BY Emory L. Groff

ATTORNEY

Sept. 6, 1955 W. HEINIGER 2,717,055
MOTION PICTURE CAMERA
Filed Jan. 22, 1953 3 Sheets-Sheet 3

*INVENTOR*
Wilfred Heiniger.

BY Emory L. Groff

ATTORNEY

United States Patent Office 2,717,055
Patented Sept. 6, 1955

2,717,055

MOTION PICTURE CAMERA

Wilfred Heiniger, Yverdon, Switzerland, assignor to Paillard S. A., Sainte-Croix, Switzerland, a Swiss company Application January 22, 1953, Serial No. 332,600

Claims priority, application Switzerland January 30, 1952

5 Claims. (Cl. 185—39)

When taking motion pictures it is often necessary to re-wind a certain length of film after it has already passed in front of the lens, such for example, where a change of scene with fade-in and superimposition are desired. Also, when taking pictures in accordance with special techniques, it may also be advantageous to control the feed of film by hand with the crank.

To permit these possibilities, some cameras are provided with a driving mechanism that can be actuated directly by means of a supplementary crank.

The present invention has for its object the provision of a motion picture camera comprising a spring motor and a film driving mechanism, wherein the camera comprises a single crank for selectively effecting both the winding of the spring motor and manual operation of the film driving mechanism, means being provided for selectively coupling the crank either to the spring motor or to the said film driving mechanism.

The accompanying drawings show, by way of example, a preferred embodiment of the invention, as well as a modified form of construction thereof.

In the drawings.

Similar references designate corresponding parts in the several figures.

Figure 1:
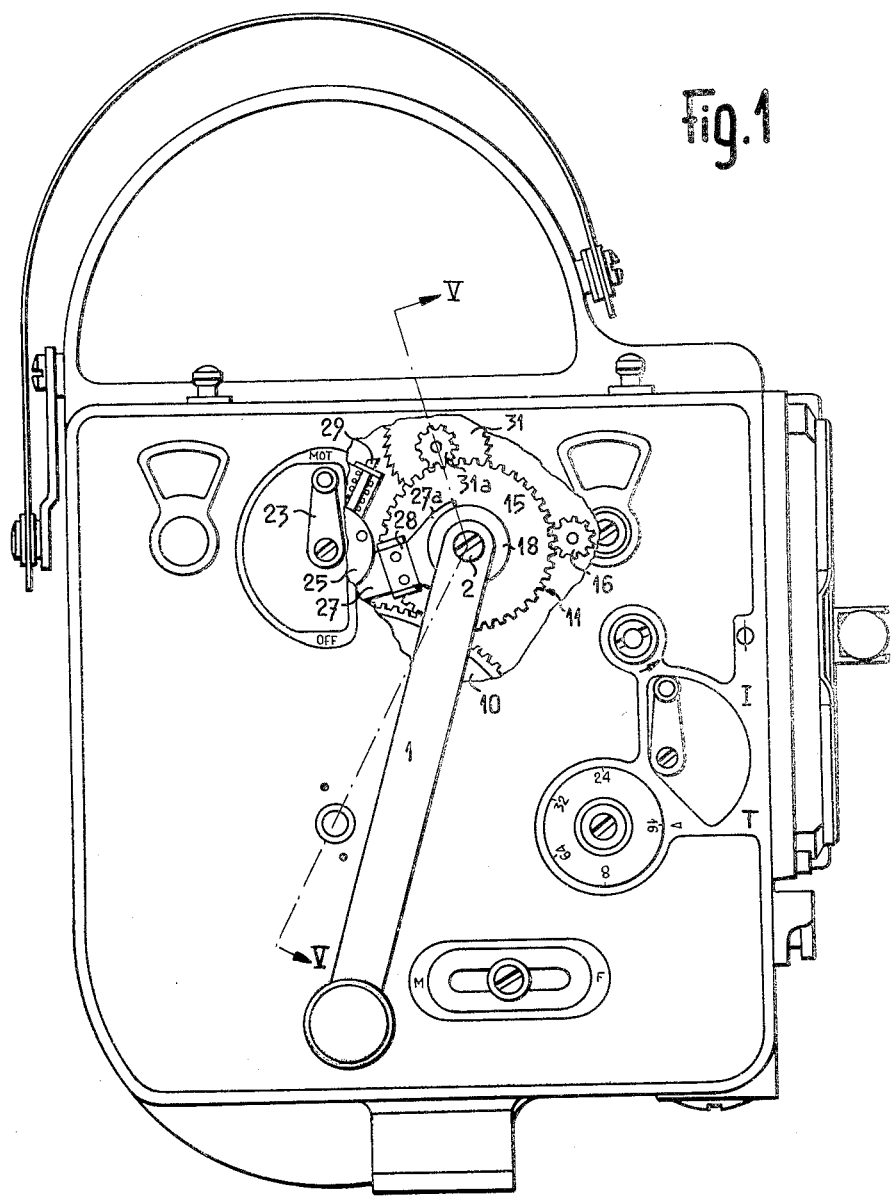
Figure 1 is a side view of a camera, with a portion of the casing broken away to show part of its mechanism.
Figure 3:
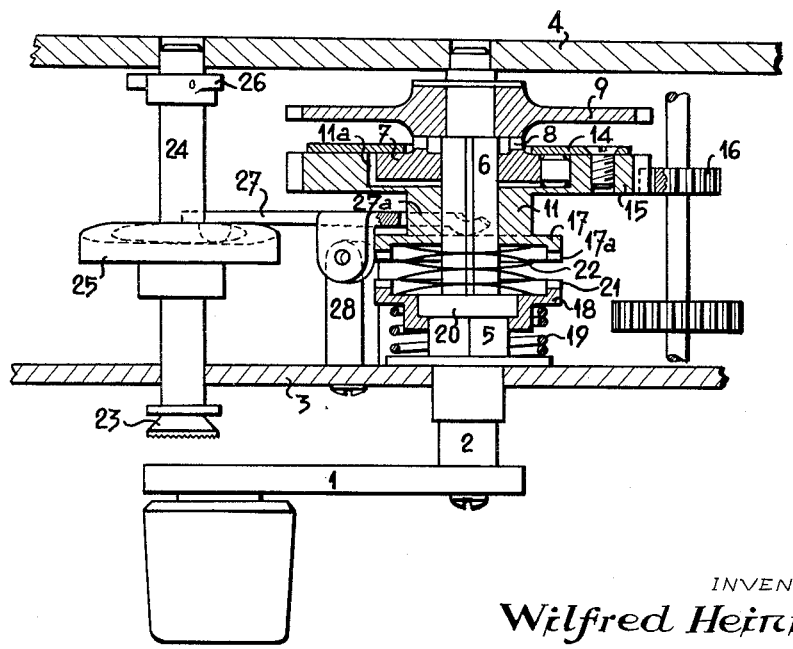
Figure 3 is a diagrammatic horizontal section of part of the camera mechanism shown in Figure 1, showing the crank and the relation of the selector means thereto.

Referring to the drawings, it will be observed from Figure 1, showing the side view of the camera, that the crank 1 is intended to drive the shaft 2, which, as will be observed from Figure 3, is journaled between supporting plates 3 and 4.

The shaft 2 has a minor part 5 and a major part 6 both of square or non-circular cross-section intermediate the points where it is journaled in plates 3 and 4. The major square portion 6 has slidably and rotatably mounted thereon a spool-like shiftable clutch unit 11 provided at one side with a recess 11a for receiving the inner multiple arm cam 7 of an over-running clutch device or free-wheeling mechanism. This cam 7, which is angularly secured to the shaft 2 by means of the square portion 6, has lateral teeth 8 constituting in effect a crown gear which as shown in Figure 3, engage with corresponding lateral teeth of a crown gear on the side of gear wheel 9 which engages with the toothed periphery of the drum 10 containing the motor spring.

The multiple arm cam 7, having the arms 7a, is nested in the said circular recess 11a of the film driving gear wheel 15 formed as an integral element of the tubular shiftable clutch unit 11 which also has integral flange 17 provided at one side with crown gear teeth 17a.

The arms 7a of the cam 7 are provided with cam faces 32 which cooperate with rollers 12 subjected to the action of springs 13 so as to frictionally lock cam 7 and clutch unit 11 together in one direction of rotation of the shaft 2 by hand crank 1.

Moreover, it is to be noted that the hub portion of the tubular spool-like member 11 is provided with a central circular bore which enables it to rotate freely on the square portion 6 of the shaft 2.

The cam 7 is held in the recess 11a of the gear wheel 15 by a retaining ring 14 which may be secured thereto by screws in the conventional manner shown in Figure 3. It will thus be seen that the cam 7 moves axially with clutch unit 11 including gear wheel 15 and flange 17, and that gear wheel 15 has teeth wide enough to engage pinion 16 of the film driving mechanism in its normal position when driven by the motor or in its shifted position when driven by the crank 1.

A relatively non-shiftable crown gear 18 is locked against rotation, to shaft 2 by its square part 5 and is held against a shoulder or abutment 20 of the shaft provided between portions 5 and 6 of square cross-section by a spring 19. Gear 18 has lateral teeth 21 intended to cooperate with teeth 17a of the mating crown gear of the shiftable unit 11. Conical spring washers 22, acting as springs, bear, on one side, against shoulder 20 and, on the other side, against the inner face of flange 17 so as to keep teeth 17a and 21 normally separated, and to force teeth 8 of cam 7 against the corresponding teeth of the drum winding gear wheel 9.

The function of the shiftable clutch unit 11 which is slidably mounted on shaft 2 is to permit the user of the camera to selectively operate the crank 1 and shaft 2 to wind the spring motor drum 10 and thus provide means for automatically driving the film operating gear train including gear 16, or, alternatively, with the aid of simple and practical selector means holding the spring driving means inactive and permitting the user to operate the film moving gear train by hand by appropriately turning the crank 1.

Figure 2:
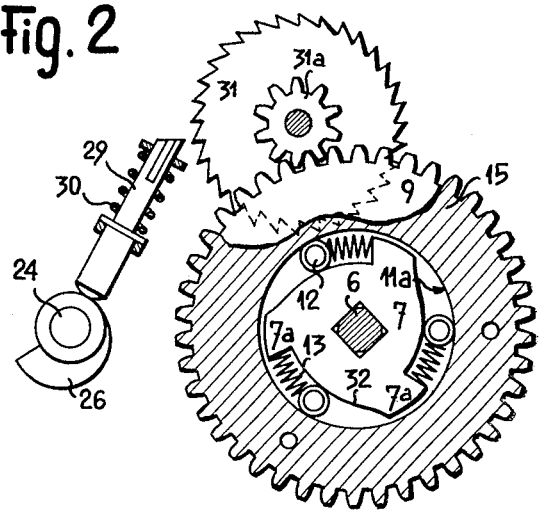
Figure 2 is an enlarged diagrammatic detail view of a portion of the selector means.
Figure 5:
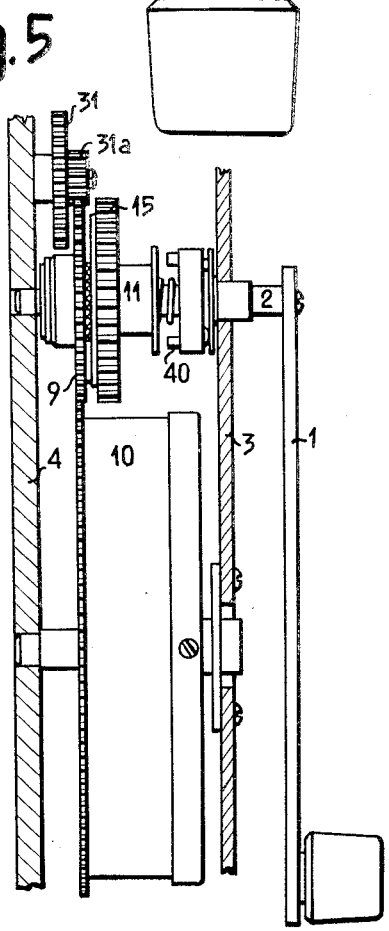
Figure 5 is a partial cross section taken on line V—V of Figure 1 in which the coupling means corresponds to that shown in Figure 4.

The said selector means includes a control lever 23 secured to shaft 24 which supports two cams 25 and 26. Cam 25 acts on outer end of lever 27, pivotally mounted on a support 28 and whose inner yoke end 27a bears against flange 17 of the shiftable clutch unit 11. Cam 26 acts on rod or detent 29, which is held against the periphery of the cam by a spring 30 (Figure 2). The rod 29 is intended to engage with the teeth of a wheel 31, which is integral in rotation with a pinion 31a in engagement with the toothed wheel 9, as clearly shown in Figure 5.

In the position of the selector lever 23 shown in Figure 1 of the drawings, the camera mechanism is driven by means of the spring motor 10.

When shaft 2 is caused to turn counterclockwise (Figures 1 and 2) by the crank 1, multiple arm cam 7 rotates within recess 11a of gear 15 without driving it, and, by means of teeth 8 cam piece 7 drives gear wheel 9 which is in engagement with drum 10, thus making it possible to wind the spring of the motor. When turning effort exerted on crank 1 is discontinued, the action of the spring drum is transmitted by gear wheel 9 and tends to turn cam 7 in the opposite direction. By a frictional binding effect, rollers 12 in cooperation with the annular wall of recess 11a then transmit the effort of the motor spring to gear wheel 15 and thus to the film-driving mechanism by pinion 16.

When the operator wishes to operate the camera manually, he turns operator's lever 23 by about an angle of 180°. This produces a rotation of shaft 24 and cams 25 and 26. As soon as the rotation of shaft 24 begins, cam 26 acts on locking rod 29 of wheel 31 so that the energy of the motor spring can no longer rotate gear wheel 9. As the rotation of shaft 24 continues, cam 25 comes into play and causes lever 27 to turn on its support 28. Lever 27 displaces the freewheeling mechanism axially against the action of spring washers 22 so that teeth 7 is disconnected from wheel 9 and teeth 17a and 21 are brought into mutual engagement. Shiftable clutch unit 11 is thus locked angularly to shaft 2 through the intermediary of crown gear 18 and the square section 5 so that it is possible to set the film driving mechanism into forward or backward motion by means of crank 1.

If, the moment pieces 11 and 18 are coupled together, the teeth of one gear occupy a position opposite that of the teeth of the other gear, crown gear 18 is axially displaced against the action of its spring 19 and the meshing of clutch unit 11 and crown gear 18 takes place only after shaft 2 has undergone a slight rotation.

Figure 4:
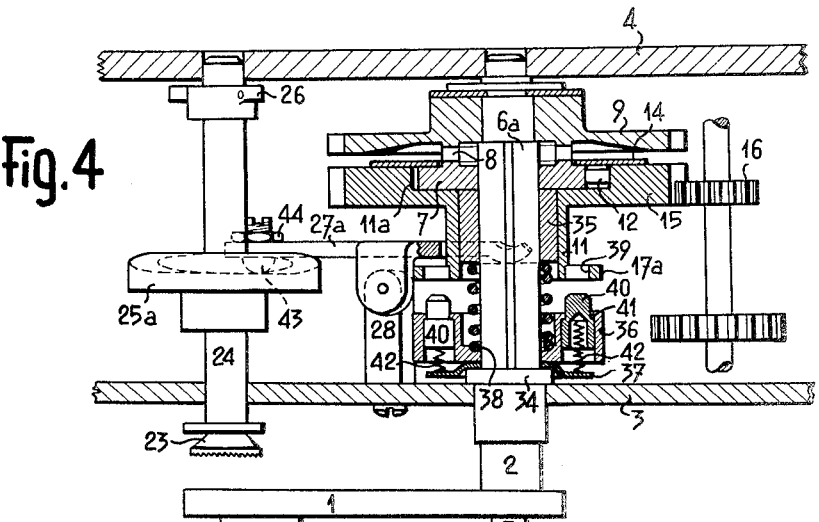
Figure 4 is a diagrammatic horizontal section of a modified form of construction.

Figure 4 shows, in section, a modified form of the construction represented in Figure 3. Shaft 2 has but a single part 6a of square cross-section, a shoulder 34 being provided at one end of part 6a to serve the purpose of an axial stop against plate 3. Clutch unit 11 has also two circular inner bores, but does no longer turn directly on the square part 6 of shaft 2. In fact, unit 11 rotates on the cylindrical outer face of bushing 35 provided with a square hole of a size corresponding to the square section 6a of shaft 2 on which bushing 35 is mounted.

Crown gear 18 of Figure 3 has been replaced by clutch element 36, provided with a square hole so as to secure it angularly to shaft 2. This member 36 is held against a washer 37 by coil spring 38 and said washer in turn bears against abutment or shoulder 34 of shaft 2. Instead of being provided with lateral teeth 17a, the flange 17 of the spool-like shiftable clutch unit 11, in the case illustrated by Figure 4, has openings or bores 39 adapted to cooperate with studs 40 of member 36. These studs fit into the openings formed in member 36 and have an intermediate shoulder 41 designed to abut against a corresponding shoulder provided in each opening of member 36 under the force of coil springs 42 which are housed partly in a recess of studs 40 and bear against washer 37.

Another difference between this form of construction and that shown in Figure 3 resides in the fact that lever 27 bears against cam 25 through the intermediary of an abutment 43, part of which is threaded and screwed into lever 27. A lock nut 44 is provided to ensure the locking of this abutment. This arrangement permits ready adjustment of the position of lever 27 relative to cam 25.

With the exception of the aforecited differences, the other elements of the mechanism are similar to those shown in Figure 3 and bear the same reference characters.

The functioning of this modification is similar to that described in regard to Figures 1 to 3. In the position shown in the drawing (Fig. 4), the driving of the crank 1 causes the winding of drum 10 through the intermediary of shaft 2, multiple armed roller cam element 7 of the freewheeling mechanism, teeth 8, and cogwheel 9.

As in the preceding case, transmission of the energy generated by the spring in drum 10 to film driving pinion 16 proceeds through the intermediary of gear 9, teeth 8, part 7, rollers 12, and member 11.

For the manual feed of film, the operator turns selector lever 23. This first causes the holding of drum 10 stationary through cam 26 and then an axial displacement of shiftable clutch 11 and of the freewheeling mechanism contained therein. This displacement separates teeth 8 of roller cam element 7 from the corresponding teeth of gear 9, while simultaneously moving shiftable clutch member 11 toward studs 40, so that the latter will penetrate the bores 39. If, the moment selector lever 23 is actuated, bores 39 are not opposite studs 40, these latter will be forced into their seats in member 11 against the action of springs 42. When crank 1 is then actuated, studs 40 will be pushed into the bores 39 by their springs 42 as soon as shaft 2 has completed an angular displacement sufficient to bring studs 40 opposite bores 39.

From the foregoing it will be seen that in both forms of the invention there is provided in combination with film driving means 16 and a spring driven motor 10 which permits the film driving means to be driven independently of the spring motor by the hand crank 1, or the spring motor to be energized by the same crank without affecting the film driving means. This is accomplished by the shiftable tubular clutch unit 11 which rotates about the square portions 5—6 of shaft 2 but by manipulating the selector lever 23 to in turn actuate shaft 24 and cams 25—26, the spring motor gear wheel 9 may be connected or disconnected with the square portion 6 of the shaft 2 by freewheeling means 7—7a, 11 and 11a while similarly the gear 15 may be locked or released from the shaft 2; and, for hand operation of 16 by 15 when the freewheeling means is ineffective the crown gear 17a of part 17 and crown gear 21 of part 18 may be engaged.

I claim:

1. In a motion picture camera having a film driving mechanism, the combination including a spring motor, a pinion wheel in said film driving mechanism, a shaft, a crank for turning said shaft, a clutch unit shiftably and rotatably mounted on said shaft, said clutch unit including an integral gear wheel engaging said pinion wheel, said gear wheel having a recess, means for winding said motor, said means being mounted on said shaft and including a roller cam angularly secured to said shaft, said roller cam being positioned in said recess, and friction means for driving said gear wheel integral with said clutch unit, whereby said pinion wheel engaging said gear wheel is driven upon the stopping of the winding of the motor, said friction means being positioned in said recess between and in contact with said roller and said gear wheel.

2. In a motion picture camera having a film driving means, the combination including, a spring motor, a pinion wheel in said film driving means, a shaft, a single crank for turning the shaft, a clutch unit slidably and rotatably mounted on the shaft and including freewheeling means stationary upon rotation of the shaft in one direction to actuate means for winding the spring motor and rotatable upon rotation of the shaft in the other direction to actuate the pinion wheel of the film driving means upon manually shifting the clutch unit, spring means normally urging the clutch unit to position for winding the spring motor, and selector means for manually shifting said clutch unit from spring motor winding position to a position to effect hand crank operation of the pinion wheel of the film driving means and also locking the spring motor.

3. In a motion picture camera having a film driving means, the combination including, a spring motor, a pinion wheel in said film driving means, a shaft having non-circular portions, an abutment between said portions, a single crank for turning the shaft, a gear wheel for winding the spring motor mounted on the shaft, a crown gear on one side of the gear wheel; a clutch unit shiftably and rotatably mounted on the non-circular portions of the shaft, said clutch unit including a tubular body and an integral gear wheel for actuating the pinion wheel of the film driving means and having a recess, a roller cam in said recess and locked with one of the non-circular portions of the shaft and having a crown gear for meshing with the crown gear on the side of the gear wheel for winding the spring motor, said clutch unit also having its tubular body provided with a flange formed with a crown gear on one side, and a gear having crown teeth mounted on another non-circular portion of the shaft for meshing with said last mentioned crown gear, spring means between the flange formed with crown teeth and the abutment on the shaft normally to maintain the same disengaged from the gear having crown teeth and spring means for constantly urging the gear with crown teeth toward one side of said abutment; and selector means for manually controlling the clutch unit to arrest movement of the gear wheel for winding the spring motor and permit the actuation of the pinion wheel of the film driving means by the shaft and crank.

4. In a motion picture camera having a film driving means, the combination including, a spring motor, a pinion wheel in said film driving means, a shaft having non-circular portions, an abutment between said portions, a single crank for turning the shaft, a gear wheel for winding the spring motor mounted on the shaft, a crown gear on one side of the gear wheel; a clutch unit shiftably and rotatably mounted on the non-circular portions of the shaft, said clutch unit including a tubular body and an integral gear wheel for actuating the pinion wheel of the film driving means and having a recess, a roller cam in said recess and locked with one of the non-circular portions of the shaft and having a crown gear for meshing with the crown gear on the side of the gear wheel for winding the spring motor, said clutch unit also having its tubular body provided with a flange formed with a crown gear on one side, and a gear having crown teeth mounted on another non-circular portion of the shaft for meshing with said last mentioned crown gear, spring means between the flange formed with crown teeth and the abutment on the shaft normally to maintain the same disengaged from the gear having crown teeth and spring means for constantly urging the gear with crown teeth toward one side of said abutment; and selector means for manually controlling the clutch unit to arrest movement of the gear wheel for winding the spring motor and permit the actuation of the pinion wheel of the film driving means by the shaft and crank, said means including a shaft, an operator's lever on the same side of the camera as the single crank, a pair of cams on said shaft, lever means operated by one of said cams for engaging with the flange of the clutch unit, and a spring urged detent actuated by the other cam for locking the spring motor.

5. In a motion picture camera having a film driving means, the combination including spaced frame parts, a spring motor, a pinion wheel in said film driving means, a shaft rotatably journalled in said frame parts and having a single non-circular intermediate portion, a crank for turning said shaft, a gear wheel for winding the spring motor free to rotate on said shaft and having a crown gear on one side; a shiftable clutch unit on the non-circular portion of the shaft, said unit including a spool-like tubular body rotatable on said non-circular portion of the shaft, said body including an integral gear for actuating the pinion wheel of the film driving means, said gear having a recess, a roller cam in said recess and locked with the non-circular portion of the shaft, a crown gear on the roller cam unit meshing with the crown gear on the side of the gear wheel for winding the spring motor, a flange integral with the said tubular body and having openings, a fixed clutch unit including a washer mounted on the non-circular portion of the shaft, spring pressed studs mounted on the said fixed clutch member, spring means for normally urging the shiftable clutch unit away from the fixed clutch unit, and selector means including a shaft having an operator's element at the outer end thereof, a cam on the shaft, a lever actuated at one end by the cam and having its other end bearing on the flange of the shiftable clutch unit and another cam on the shaft actuating detent means for holding the gear wheel for actuating the spring motor.

References Cited in the file of this patent

UNITED STATES PATENTS

| | | |
|---|---|---|
| 1,334,057 | Stringham | Mar. 16, 1920 |
| 1,552,552 | Gauriat | Sept. 8, 1925 |
| 2,019,702 | Hernlund et al. | Nov. 5, 1935 |
| 2,023,430 | McCain et al. | Dec. 10, 1935 |
| 2,140,445 | Mihalyi | Dec. 13, 1938 |
| 2,480,880 | Richards | Sept. 6, 1949 |
| 2,534,083 | Van Den Broek | Dec. 12, 1950 |